July 28, 1925.  1,547,683
E. A. REID ET AL
WIND-UP ATTACHMENT FOR FABRIC CUTTING MACHINES
Filed May 9, 1923   4 Sheets-Sheet 1
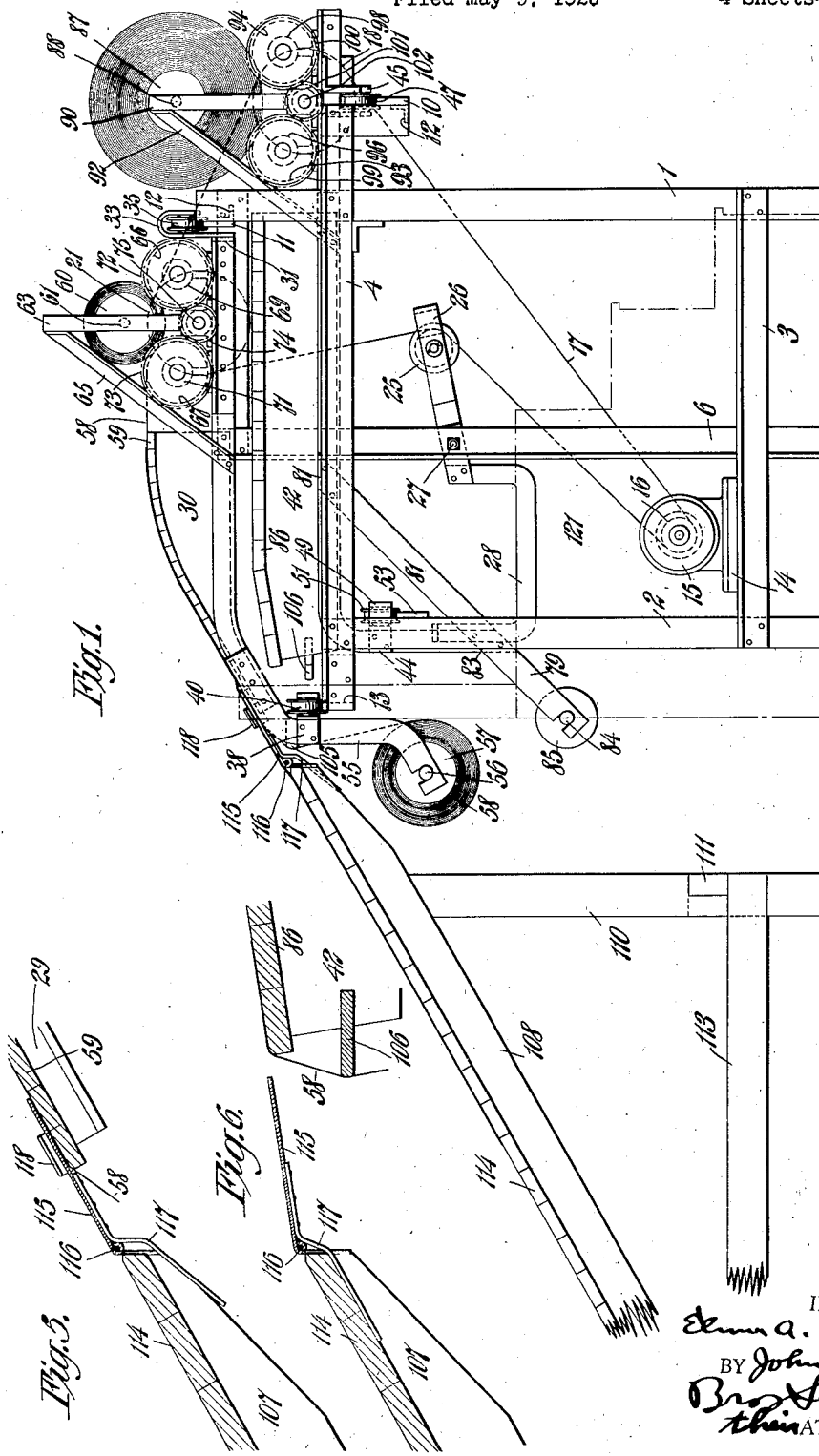
INVENTORS
Edwin A. Reid
BY John Riehl
Bro Seward
their ATTORNEYS

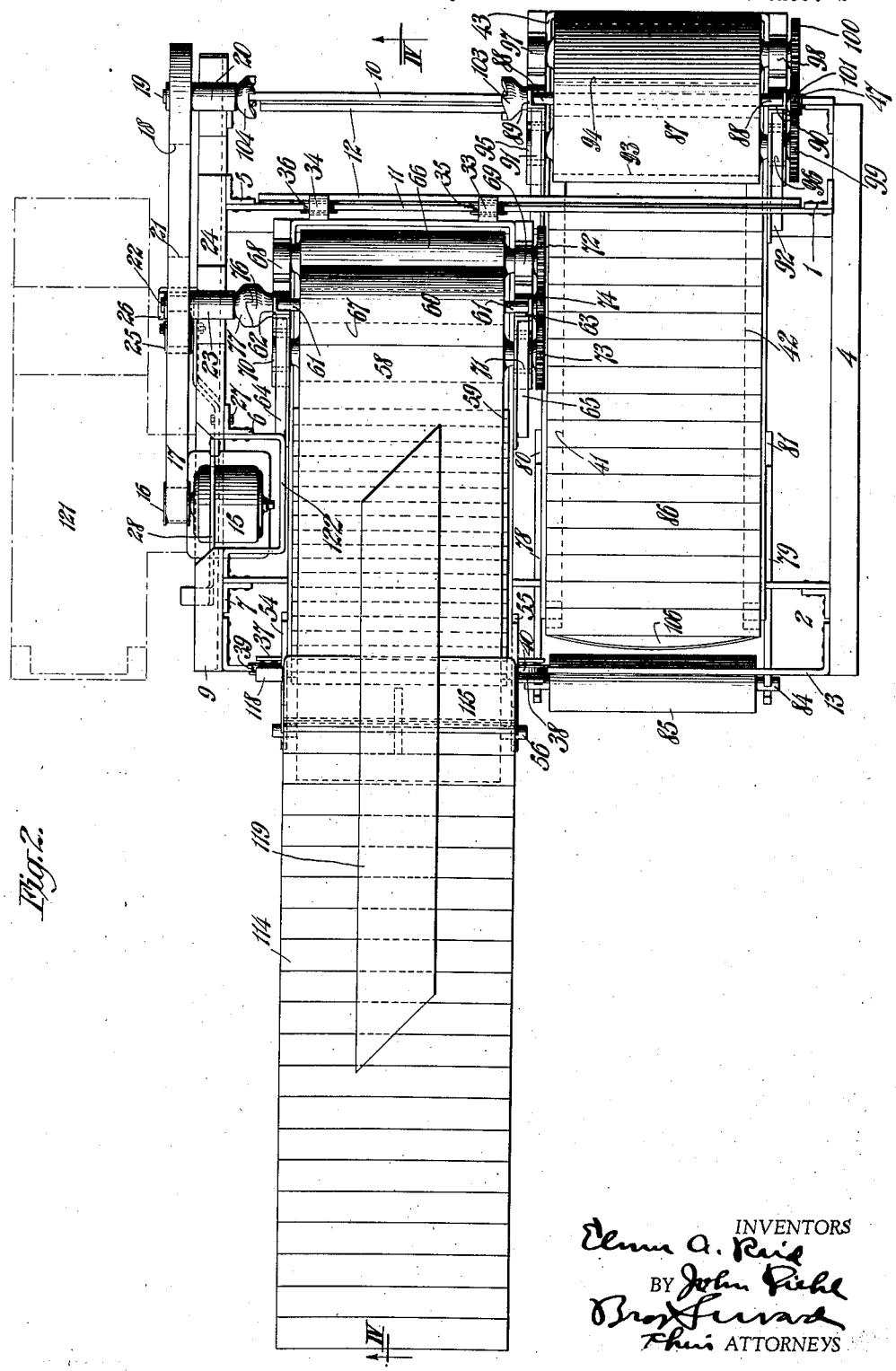

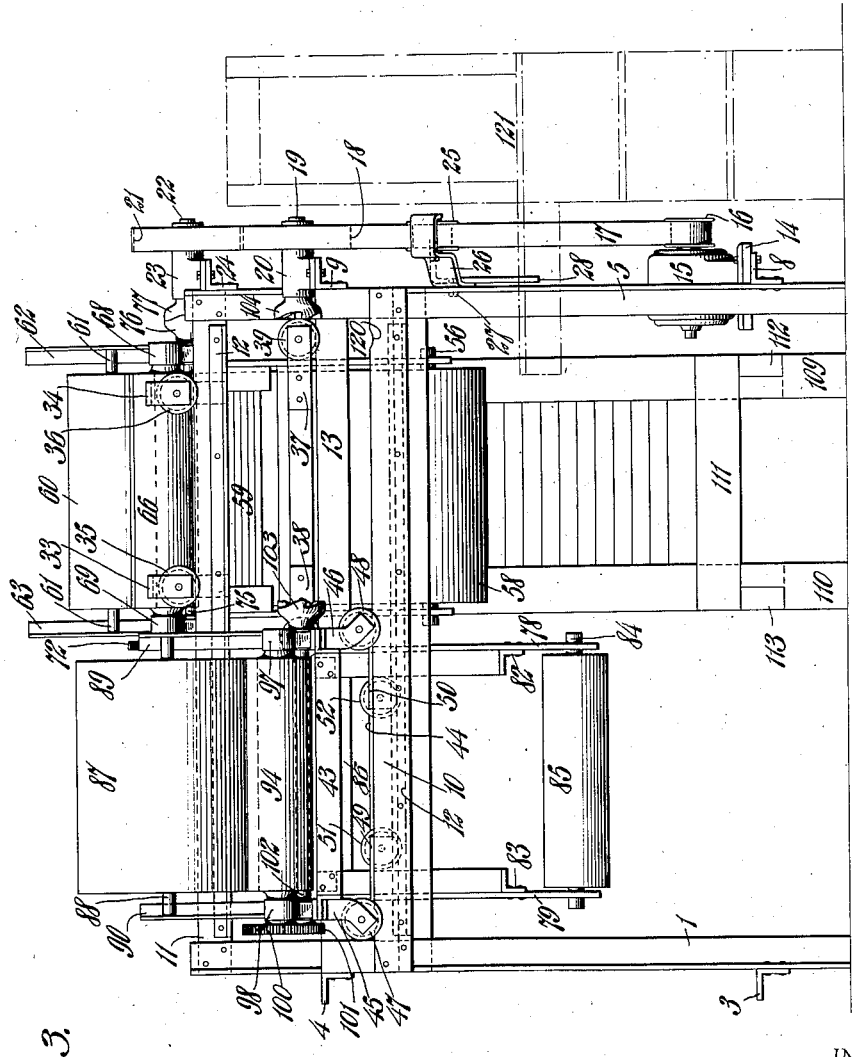

July 28, 1925.
E. A. REID ET AL
1,547,683
WIND-UP ATTACHMENT FOR FABRIC CUTTING MACHINES
Filed May 9, 1923
4 Sheets-Sheet 4
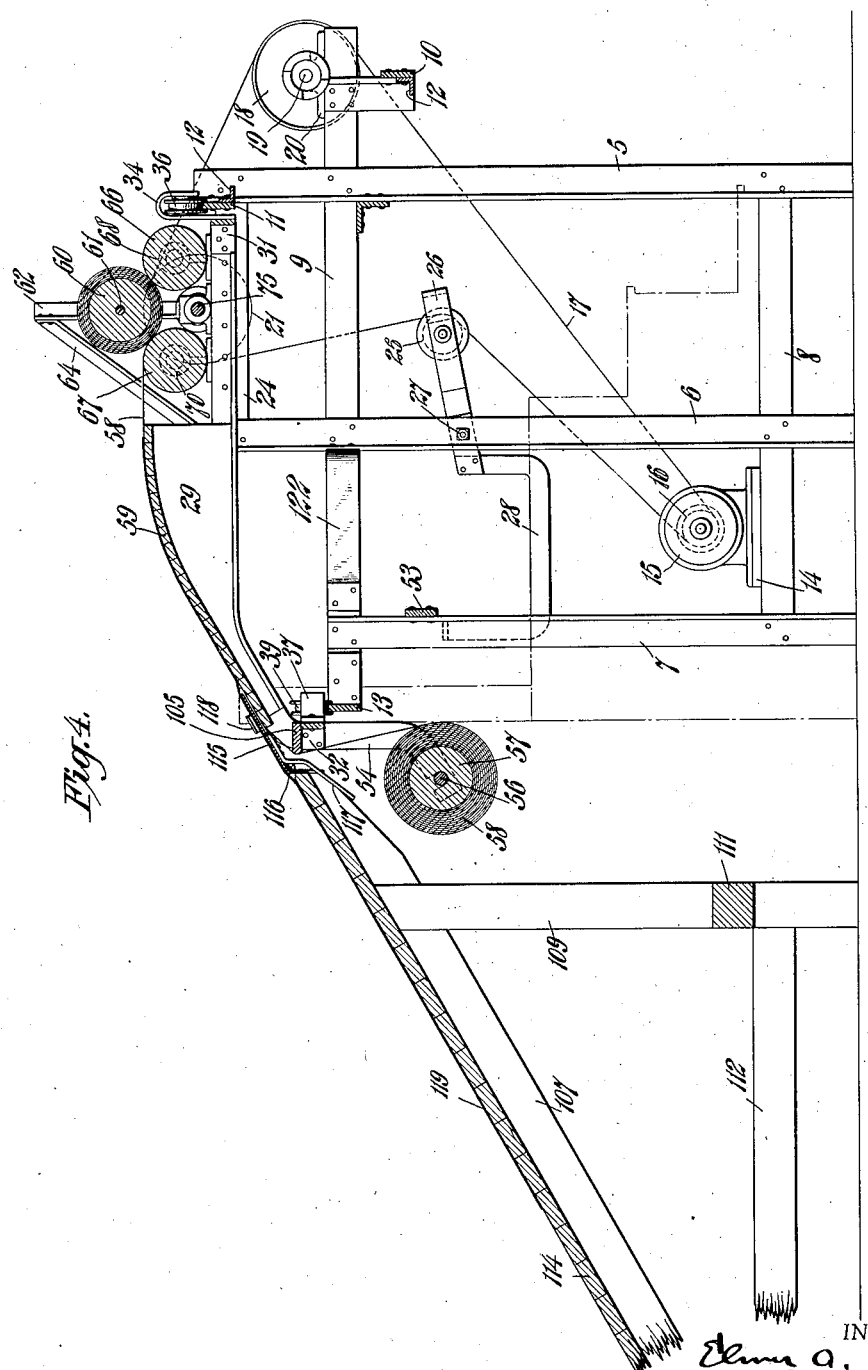

Patented July 28, 1925.

1,547,683

UNITED STATES PATENT OFFICE.

ELMER A. REID, OF MORRISVILLE, PENNSYLVANIA, AND JOHN DIEHL, OF TRENTON, NEW JERSEY, ASSIGNORS TO AJAX RUBBER COMPANY, INC., OF NEW YORK, N. Y., A CORPORATION OF NEW YORK.

WIND-UP ATTACHMENT FOR FABRIC-CUTTING MACHINES.

Application filed May 9, 1923. Serial No. 637,846.

*To all whom it may concern:*

Be it known that we, ELMER A. REID, a subject of the King of Great Britain, and JOHN DIEHL, a citizen of the United States, and residents of Morrisville, in the county of Bucks and State of Pennsylvania, and Trenton, in the county of Mercer and State of New Jersey, respectively, have invented a new and useful Improvement in Wind-Up Attachments for Fabric-Cutting Machines, of which the following is a specification.

This invention relates to a wind-up apparatus for fabric cutting machines and, more particularly, to an apparatus or attachment which may be used in connection with a machine for cutting bias strips from rubber impregnated fabric in the manufacture of tires. The function of the apparatus is to receive the cut bias strips and wind them up on a roll, with the intermediation of a liner of muslin or other suitable material.

An object of the invention is to provide such an apparatus which is designed to be continuous in its operation so that the cutting machine in connection with which it is used need not be stopped at intervals.

Another object consists in providing such an apparatus which automatically removes any wrinkles from the fabric strips received thereby, so as to insure that the same will be wound up in flat condition.

Another object consists in providing such an apparatus which is very rapid in its operation.

A further object consists in providing certain improvements in the form, construction and arrangement of the several parts, whereby the above named and other objects may be effectively attained.

A practical embodiment of the invention is represented in the accompanying drawings, in which Fig. 1 represents a side elevation of the apparatus.

Fig. 2 represents a top plan view thereof.

Fig. 3 represents an end view thereof, looking from the right in Fig. 1.

Fig. 4 represents a section taken in the plane of the lines IV—IV of Fig. 2, looking in the direction of the arrows.

Fig. 5 represents an enlarged detail section showing the means for connecting the inclined table with the upper carriage, to be hereinafter described.

Fig. 6 represents a similar view showing the means in such position as to connect the inclined table with the lower carriage.

This apparatus is well adapted for use in connection with the fabric cutting machine shown and described in United States Letters Patent to Andrew C. Bolton, No. 942,164, dated December 7, 1909, in which bias strips are rapidly cut from a web of rubber impregnated fabric. It is desired to take these strips from the cutting machine and wind them up for convenience in storing and handling, and the apparatus herein shown and described is particularly adapted for doing this in an expeditious and accurate manner. Thus, while this apparatus is, of itself, of considerable size, it may well be referred to as a wind-up attachment for a fabric cutting machine.

The apparatus comprises a frame which includes, at one side, uprights 1, 2, which are connected at the bottom by a side bar 3 and near the top by a side bar 4. On the other side, the said frame includes uprights 5, 6 and 7 with a lower side bar 8 and an upper side bar 9. The parts just described are preferably composed of angle iron, as clearly shown in Figs. 1 and 4.

At the back of the frame is a cross bar 10, which is located above the middle of the frame, and another cross bar 11, which is located at the top of the frame. The bars 10 and 11 are preferably composed of flat iron, braced with small angle iron reinforcing bars 12.

The front of the frame, which is adjacent the inclined table (to be hereinafter described) has a cross bar 13 which extends from bar 9 to bar 4.

On the side bar 8 there is mounted a shelf 14 which carries a motor 15. The drive pulley 16 of the motor is engaged by a belt 17 which passes around the pulley 18 (Fig. 4) that is carried on a shaft 19 which is journaled in a bearing 20 supported on side bar 9. The belt 17 also passes around a pulley 21 that is mounted on a shaft 22 carried in a bearing 23 that is supported on an angle iron 24 which is carried by the uprights 5 and 6. Finally, the belt 17 is engaged by an idler pulley 25 that is mounted in an arm 26 which is pivoted at 27 in upright 6, designed for convenient operation by the foot of the operator in stopping and starting the wind-up.

The arrangement just described constitutes a continuously operating drive for pulleys 18 and 21, and hence, for their shafts 19 and 22.

The apparatus includes two carriages, one located above the other. The upper carriage includes side members 29, 30 and end members 31, 32. The end member 31 carries a pair of brackets 33, 34, in each of which is mounted a wheel 35, 36, the said wheels being grooved and designed to travel upon the cross bar 11. The end member 32 carries a pair of brackets 37, 38, in which are mounted grooved wheels 39, 40 that ride upon cross bar 13 as a track. This arrangement enables the upper carriage composed of the parts just described to travel back and forth laterally on top of the angle iron frame of the apparatus.

The lower carriage consists of side members 41, 42 and end members 43, 44. The end member 43 carries a pair of brackets 45, 46 in which are mounted grooved wheels 47, 48 that ride upon the cross bar 10 as a track; while end member 44 has a pair of brackets 49, 50 in which are mounted grooved wheels 51, 52 which ride upon a cross bar 53, said cross bar being supported by uprights 2 and 7. The arrangement just described enables the lower carriage to move back and forth on the framework of the apparatus, in the same manner as the upper carriage.

The upper carriage has a pair of tailpieces 54, 55 which are fastened to the side members 29, 30, and are recessed on their extremities so as to support the shaft 56 of the roll 57 which is intended to carry a quantity of sheet liner material 58, such as muslin. It will be understood that these rolls of liner material may be placed in the open bearings in the ends of the tailpieces 54, 55, as desired.

The liner 58 is intended to be threaded from the roll 57 upwardly along the top surface 59 of the upper carriage. This surface 59 is preferably composed of boards fastened on top of the side members 29, 30 and, by reference to Figs. 1 and 4, it will be seen that the surface slants upwardly and is somewhat curved. After the liner 58 has been thus threaded, its leading end is wound on roll 60 which is carried on shaft 61 which is fited to slide in angle iron uprights 62, 63 (Fig. 3); the said uprights being braced by props 64, 65 that are connected with the uprights and with side members 29 and 30 respectively.

The roll 60 rests upon a pair of driving rolls 66, 67. Roll 66 is journaled in bearings 68, 69 carried on side members 29, 30, and roll 67 is journaled in bearings 70, 71 also mounted on said side members. The said rolls 66 and 67 have spur gears 72, 73 fixed at one end thereof, which gears mesh with another gear 74 that is carried on a shaft 75 which also finds a bearing support on side members 29, 30. On the end of shaft 75, opposite the gear 74, there is formed a clutch member 76 that is adapted to mate with another clutch member 77 which is fixed on the end of shaft 22 that carries pulley 21.

As a result of the construction just described, it will be seen that, when the upper carriage is slid so as to bring clutch members 76 and 77 into engagement with each other, the gear 74 will be driven from the motor 15 and belt 17, and will in turn drive the rolls 66, 67 which, by virtue of their frictional engagement with roll 60, will drive the latter and cause it to wind the liner 58 upon itself while unwinding the same from roll 57. As the diameter of roll 60 increases owing to the winding of the liner 58 thereupon, the shaft 61 of roll 60 will gradually move upwardly in the angle iron members 62, 63, while the periphery of the liner material on roll 60 remains in contact with the driving rolls 66, 67. This frictional drive results in a constant speed of travel of the liner material along the surface 59 because, as the wind-up roll 60 increases in diameter, its rotary speed decreases.

The lower carriage is equipped with mechanism similar to that just described in connection with the upper carriage; and this mechanism includes a pair of tailpieces 78, 79, which are fixed to the side members 41, 42, as indicated at 80, 81 (Fig. 2) and to the depending ends of said side members, as indicated at 82, 83. The extremities of these tailpieces 78, 79 have open bearings which receive the shaft 84 of a roll 85 that is adapted to receive a winding of liner material as in the case of roll 57. The liner from roll 85 is threaded up over the edge of surface 86 which is, like surface 59, formed of boards fastened to the top of side members 41, 42. The liner is led along the top of surface 86 to roll 87 which has a shaft 88 that is slidably mounted in angle iron uprights 89, 90, that are braced by struts 91, 92 which are fixed to the said uprights and to the side members 41, 42.

A pair of driving rolls 93, 94 are arranged to have frictional contact with the periphery of the material on roll 87, and the said driving rolls are mounted in bearings 95, 96, 97, 98, which are carried on rearward extensions of the side members 41, 42. Roll 93 has a gear 99 fixed on one end thereof, and roll 94 has a similar gear 100 fixed on its end. These said gears mesh with a third gear 101 which is carried on a shaft 102 that is supported in bearings on side members 41, 42. The opposite end of shaft 102 carries a clutch member 103 which is shaped to mate with a clutch member 104 that is fixed to shaft 19 that carries belt pulley 18. The result of this is that, when the clutch members 103 and 104 are in engagement, the roll 87 will be constantly driven so as to wind upon itself liner material, drawing the same from roll 85;
and the wind-up of this material will always be at an equal speed owing to the frictional engagement of driving rolls 93, 94 with the periphery of the material being wound on roll 87, as already described in connection with roll 60 and driving rolls 66, 67.

In order to facilitate the drawing of the liner material from the rolls 57 and 85 to rolls 60 and 87, and to automatically remove wrinkles, a convex guide piece 105 is fixed to the end member 32 of the upper carriage, while a similar guide piece 106 is fixed to the side members 41, 42 of the lower carriage.

As already mentioned, another part of the apparatus consists of an inclined table, and the same is here shown as consisting of inclined stringers 107, 108 which are supported adjacent the angle iron frame of the apparatus by uprights 109, 110 which are connected by a cross bar 111. Horizontal stringers 112, 113 extend from uprights 109, 110, and are connected with the inclined stringers 107, 108 at the point (not shown) where the two sets of stringers meet. The completion of this framing, beyond that shown in the drawings, is obvious to any one skilled in the art.

A surface 114 of boards laid transversely on the stringers 107, 108 constitutes the table top, and it will be seen that the upper edge of the table top is adjacent the angle iron framing and parts carried thereby, previously described.

In order to establish operative connection between the inclined table 114 and the surfaces 59 and 86 of the sliding carriages, a flap 115 is pivoted at 116 to the edge of the table top 114. This flap is arranged to have its free end rest upon the surface 59 of the upper carriage when the latter is in line with the inclined table 114, as clearly shown in Fig. 5. The flap is also arranged to project almost to surface 86 of the lower carriage, when the latter is in line with the inclined table 114, as clearly shown in Fig. 6. In this last condition, the flap is supported against downward swinging by a brace 117 which is fixed thereto and has its free end projecting so as to come into contact with the table top 114.

It will be clear that, when the upper carriage moves out of line with the inclined table 114 and the lower carriage moves into line therewith, the flap 115 will drop, under the influence of gravity, into the position shown in Fig. 6. Then, when the lower carriage moves away and the upper carriage returns into line with the inclined table 114, the flap is engaged by an inclined lifter 118, which is mounted at the edge of the surface 59 of the upper carriage, and thereby lifted up so as to cause it to rest upon the said surface 59.

In operation, rolls 57 and 85, fully supplied with liner material 58, are placed in the open bearings in the tailpieces of the upper and lower carriages. The liner material from the roll 57 is threaded up around the guide piece 105, under the flap 115, along the surface 59, and its leading end wound around roll 60.

In a similar manner, the liner material from roll 85 is led up around guide piece 106, along surface 86, and its leading end wound around roll 87. The upper carriage (for instance) is slid into line with the inclined table 114 so that its clutch members 76 and 77 are in engagement. This will cause the roll 60 to be driven and to start to unwind the liner material 58 from roll 57. Simultaneously, the frabric cutting machine (not shown) is set in operation, and operatives receive the cut bias strips, denoted by 119 (Fig. 2) from the cutting machine. Preferably, there are two operatives, each one taking hold of an end of a strip 119. One of the operatives momentarily presses his end of the strip 119 upon the liner material which is moving along the top of surface 59 of the upper carriage, and the other operative allows his end of the said strip to fall down upon the top of table 114. The adherence between the rubber impregnated strip 119 and the liner material will immediately cause the latter to draw the strip along and to wind it up on roll 60 with the liner material between each convolution. It will be seen that, in this operation, the strip 119 will be kept perfectly flat, because the inclined table 114 is not moving and it is the leading end of the fabric strip which, by its adherence to the moving liner material, drags the strip along, thereby removing any wrinkles which may be in the strip as it is deposited by the operatives.

The operation just described will be continued, strip after strip being deposited in succession, until all the liner material 58 has been unwound from roll 57. At this juncture, it is only necessary for a third operative to manually slide the upper carriage out of alignment with the inclined table 114 and simultaneously slide the lower carriage into alignment with the inclined table. This movement will cause the flap 115 to drop down into operative position with respect to the lower carriage, as shown in Fig. 6, and the operation of depositing the cut strips

119 on this wind-up apparatus may be continued, the only difference being that the operator having the leading end of the strip presses it upon the liner material which is traveling along surface 86 of the lower carriage, and that the liner material and cut fabric strips are wound up on roll 87 instead of on roll 60.

While this operation is proceeding, the filled roll 60 and the empty roll 57 may be removed from their mountings in the upper carriage and substituted by an empty roll 60 and a filled roll 57, so that, after the liner on the lower carriage has been exhausted, the third operator may instantly slide the lower carriage out of alignment with the inclined table while simultaneously moving the upper carriage back into alignment therewith.

Thus, it will be seen that the apparatus is continuous in its operation and there is no occasion for stopping the cutting machine. This is of great importance, since a pronounced economy in time is accomplished.

In order to temporarily hold the carriages in their operative and inoperative positions, the cross bars 11, 13, 10 and 53, which serve as tracks for the upper and lower carriages, are provided with depressions 120 adapted to receive the wheels of the said carriages.

Owing to the fact that the apparatus is quite large, we provide a stepped platform 121 for the operator taking the leading end of the strip 119 from the cutting machine. This platform is diagrammatically shown in the drawings, and it will also be observed (Fig. 2) that the outer side bar 9 is bent inwardly, as indicated at 122, thus forming a recess in the frame which enables the said operator to lean close to the carriages when placing the leading end of the strip on the moving liner 58.

We desire it to be understood that various changes may be resorted to in the form, construction and arrangement of the several parts without departing from the spirit and scope of our invention; and hence, we do not intend to be limited to the details herein shown and described except as they may be included in the claims.

What we claim is:

1. An apparatus of the character described comprising, a table adapted to receive strips of fabric, a plurality of carriages arranged for alternate cooperation with the table, a moving element traversing each carriage which moving element is adapted to transport the fabric strips when its carriage is in cooperation with the table, and means for forming said moving element and said strips of fabric into a common assembly, said last named means being actuated when a carriage is brought into cooperation with the table.

2. An apparatus of the character described comprising, a table adapted to receive strips of fabric, a plurality of carriages arranged for alternate cooperation with the table, a moving element traversing each carriage which moving element is adapted to transport the fabric strips when its carriage is in cooperation with the table, and means for winding said moving element and said strips of fabric into a roll.

3. An apparatus of the character described comprising, a table adapted to receive strips of fabric, a plurality of sliding carriages arranged to be moved into and out of cooperative relation with the table, a moving element traversing each carriage which moving element is adapted to transport the fabric strips when its carriage is in cooperative relation with the table, and means for forming said moving element and said strips of fabric into a common assembly, said last named means being actuated when a carriage is brought into cooperative relation with the table.

4. An apparatus of the character described comprising, a table adapted to receive strips of fabric, a plurality of sliding carriages located one above the other and arranged to be moved into and out of cooperative relation with the table, a moving element traversing each carriage which moving element is adapted to transport the fabric strips when its carriage is in cooperative relation with the table, and means for forming said moving element and said strips of fabric into a common assembly, said last named means being actuated when a carriage is brought into cooperative relation with the table.

5. An apparatus of the character described comprising, a table adapted to receive strips of fabric, a plurality of carriages arranged to be alternately moved into and out of cooperative relation with the table, means on each carrier for supporting a liner roll, means on each carriage for supporting a wind-up roll for the liner and cut fabric strips, each carriage being constructed so as to support the liner in its travel from the liner roll to the wind-up roll, and means for actuating the wind-up roll when its carriage is in operative relation with the table.

6. An apparatus of the character described comprising, a table adapted to receive strips of fabric, a plurality of carriages arranged to be alternately moved into and out of cooperative relation with the table, means on each carriage for supporting a liner roll, means on each carriage for supporting a wind-up roll for the liner and cut fabric strips, each carriage being constructed so as to support the liner in its travel from the liner roll to the wind-up roll, and means for actuating the wind-up roll when its carriage is in operative relation with the table, said last named means being adapted to engage the periphery of the material on said wind-up roll.

7. An apparatus of the character described comprising, a table adapted to receive strips of fabric, a plurality of carriages arranged for alternate cooperation with the table, a moving element traversing each carriage which moving element is adapted to transport the fabric strips when its carriage is in cooperation with the table, means for forming said moving element and said strips of fabric into a common assembly, said last named means being actuated when a carriage is brought into cooperation with the table, and a device for bridging the space between the table and each carriage when the latter is in cooperation with the table.

8. An apparatus of the character described comprising, a table adapted to receive strips of fabric, a plurality of carriages arranged for alternate cooperation with the table, a moving element traversing each carriage which moving element is adapted to transport the fabric strips when its carriage is in cooperation with the table, means for forming said moving element and said strips of fabric into a common assembly, said last named means being actuated when a carriage is brought into cooperation with the table, and a device for bridging the space between the table and each carriage when the latter is in cooperation with the table, said device being adapted to fall by gravity into proper position with respect to one carriage when it is in cooperation with the table and to be positively elevated into proper position with the other carriage when it is in cooperation with the table.

9. An apparatus of the character described comprising, a table adapted to receive strips of fabric, a plurality of carriages arranged for alternate cooperation with the table, a frame supporting said carriages, a moving element traversing each carriage which moving element is adapted to transport the fabric strips when its carriage is in cooperation with the table, means for forming said moving element and said strips of fabric into a common assembly, said last named means being actuated when a carriage is brought into cooperation with the table, and said frame being recessed in order to permit an operator closely to approach each carriage when it is in cooperation with the table in order to enable said operator properly to bring strips of fabric on the table into engagement with the moving element.

10. An apparatus of the character described comprising, a table, a plurality of carriages arranged to be moved into and out of operative relation with the table, a source of liner material, a roll for receiving liner material and fabric strips, said liner material being adapted to be passed from its source over the top of the carriage that is in operative relation with the table and onto the roll, and means for driving the roll, whereby strips of fabric laid upon the table with their leading ends upon the liner material will be wound up on the roll with the liner material in a smooth condition.

11. An apparatus of the character described comprising, a table, a plurality of carriages arranged to be moved into and out of operative relation with the table, a source of liner material, a roll for receiving liner material and fabric strips, said liner material being adapted to be passed from its source over the top of the carriage that is in operative relation with the table and onto the roll, and means for driving the roll automatically set in operation by the movement of a carriage into operative relation with the table, whereby strips of fabric laid upon the table with their leading ends upon the liner material will be wound up on the roll with the liner material in a smooth condition.

12. An apparatus of the character described comprising, a table, a plurality of carriages arranged to be moved into and out of operative relation with the table, a source of liner material, a roll mounted on each carriage for receiving liner material and fabric strips, said liner material being adapted to be passed from its source over the top of the carriage that is in operative relation with the table and onto the roll, and means for driving the roll automatically set in operation by the movement of a carriage into operative relation with the table, whereby strips of fabric laid upon the table with their leading ends upon the liner material will be wound up on the roll with the liner material in a smooth condition.

In testimony, that we claim the foregoing as our joint invention, we have signed our names this 4th day of May 1923.

ELMER A. REID.
JOHN DIEHL.